D. M. HARTSOUGH.
ANTITIPPING DEVICE FOR TRACTORS.
APPLICATION FILED JAN. 28, 1914.

1,138,610.

Patented May 4, 1915.
2 SHEETS—SHEET 1.

Witnesses.
E. C. Skinkle
A. H. Opsahl

Inventor
D. Maurice Hartsough
By his Attorneys
Williamson & Merchant

D. M. HARTSOUGH.
ANTITIPPING DEVICE FOR TRACTORS.
APPLICATION FILED JAN. 28, 1914.

1,138,610.

Patented May 4, 1915.
2 SHEETS—SHEET 2.

Witnesses
E. C. Skinkle
A. H. Opsahl

Inventor
D. Maurice Hartsough
By his Attorneys
Williamson Merchant

UNITED STATES PATENT OFFICE.

D. MAURICE HARTSOUGH, OF MINNEAPOLIS, MINNESOTA, ASSIGNOR TO BULL TRACTOR COMPANY, OF MINNEAPOLIS, MINNESOTA, A CORPORATION OF MINNESOTA.

ANTITIPPING DEVICE FOR TRACTORS.

1,138,610.  Specification of Letters Patent.  Patented May 4, 1915.

Application filed January 28, 1914. Serial No. 814,970.

*To all whom it may concern:*

Be it known that I, D. MAURICE HARTSOUGH, a citizen of the United States, residing at Minneapolis, in the county of Hennepin and State of Minnesota, have invented certain new and useful Improvements in Antitipping Devices for Tractors; and I do hereby declare the following to be a full, clear, and exact description of the invention, such as will enable others skilled in the art to which it appertains to make and use the same.

My invention relates to tractors of the type disclosed and claimed in my co-pending application S. N. 792,275, filed of date, September 29th, 1913, and has for its object to provide a so-called anti-tipping device therefor.

The tractor above described has three wheels, to-wit, two rear wheels and one front wheel. Of the two rear wheels, one only is a traction wheel and this wheel carries by far the greater part of the weight of the tractor. The front wheel is located directly in front of the relatively large traction wheel and is adapted to run in the same furrow where it is utilized as a steeering and guiding wheel. This front wheel and the offset rear wheel carry relatively small parts of the load, so that the center of gravity of the machine is brought very close to the single rear traction wheel. This arrangement is just what is desired in a tractor of this character, and there is no danger of the tractor tipping over while running level, but when running on a side hill, with the offset rear wheel higher than the traction wheel, or when the traction wheel drops into a rut, the tractor is very apt to be tipped over. My present invention provides an extremely simple and efficient device which will positively prevent the tractor from tipping over under the conditions above stated.

The invention is illustrated in the accompanying drawings wherein like characters indicate like parts throughout the several views.

Figure 1:
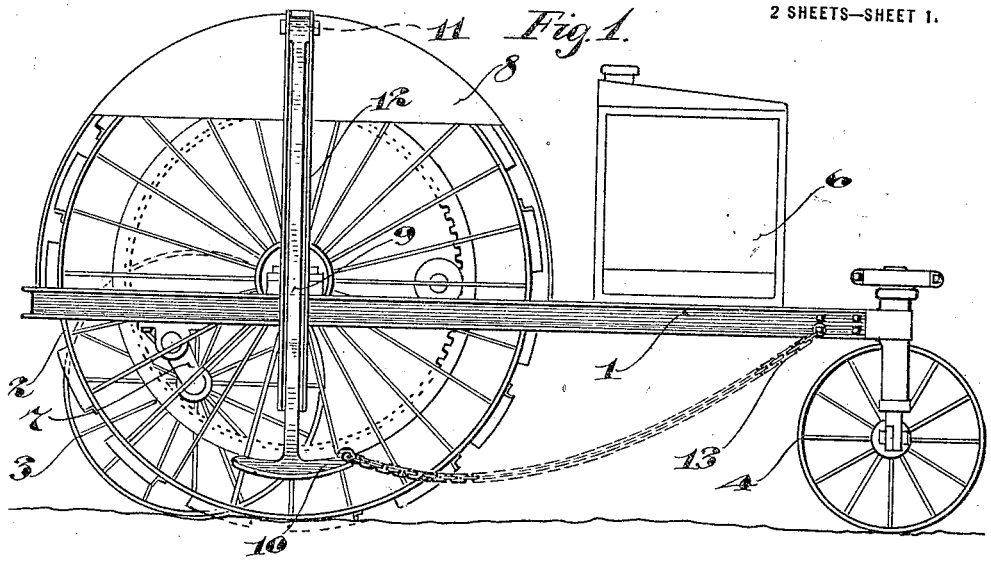
Figure 2:
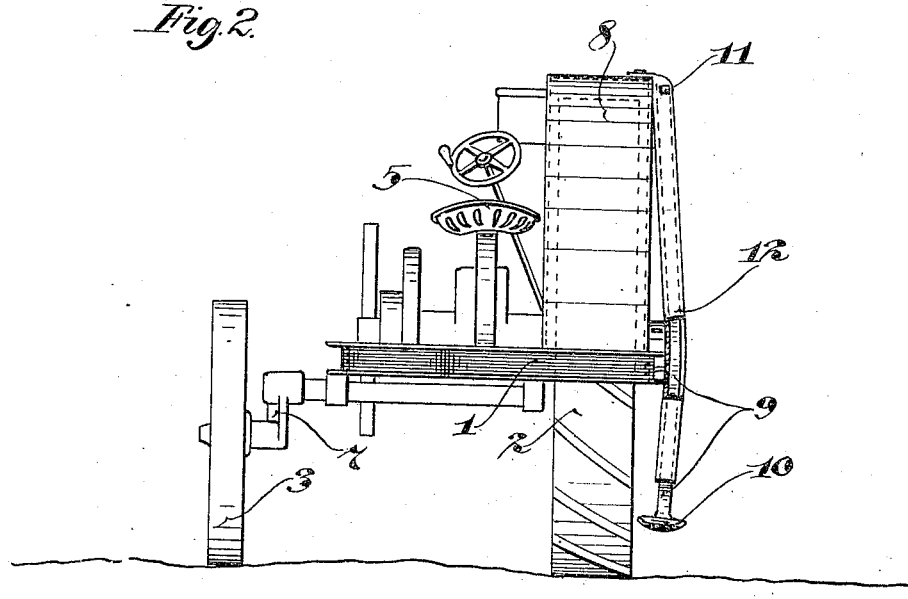
Figure 3:
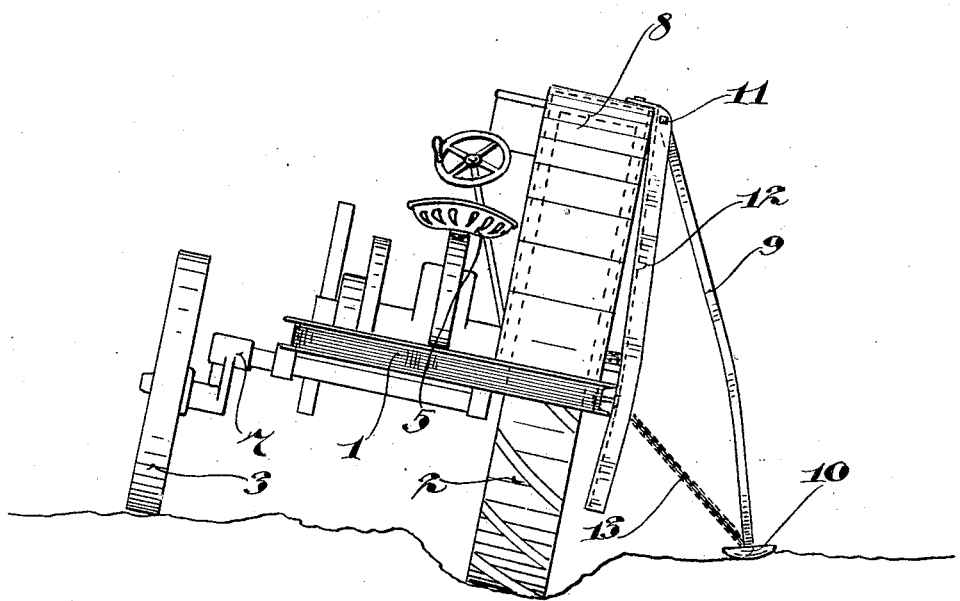

Referring to the drawings: Figure 1 is a view in right side elevation showing the improved tractor with my improved so-called anti-tipping device applied thereto; Fig. 2 is a rear elevation of the tractor and parts shown in Fig. 1, some parts being broken away, showing the tractor on level ground; and Fig. 3 is a view corresponding to Fig. 2, but showing the tractor on unlevel ground.

The parts of the tractor may be briefly described as follows: The framework of the tractor truck is indicated as an entirety by the numeral 1, the rear and relatively large traction wheel by the numeral 2, the offset rear wheel by the numeral 3, the front steering and guiding wheel by the numeral 4, the operator's seat by the numeral 5, and the radiator of the explosive engine by the numeral 6. The explosive engine is not shown, but would be mounted on the framework 1 close to the inner side of the traction wheel. The offset rear wheel 3 is journaled to an adjustable crank axle 7 by means of which the adjacent side of the framework 1 may be raised and lowered, so as to keep the truck frame level when the traction wheel 2 and guide wheel 4 are running in a furrow.

The numeral 8 indicates heavy and strong metallic hood secured on the truck frame 1 and covering the upper portion of the traction wheel 2.

The anti-tipping device, as preferably constructed, is in the form of a metallic leg 9 provided at its free lower end with a guide engaging shoe 10, and at its upper end pivotally connected at 11 to the upper end of a channel bar 12, which channel bar is bolted or otherwise rigidly secured at its upper end to the top of the hood 8, and near its lower end, to the right hand side bar of the truck frame 1. When the tractor is on level ground, the leg 9 hangs within the channel 12 close to the traction wheel, as shown in Fig. 2 and with its shoe 10 considerably raised above the ground, but when the tractor is tipped into a dangerous position, approximately as shown in Fig. 3, the leg 9 will swing outward, and its shoe 10 will engage the ground and thereby prevent the machine from tipping over toward the right, or toward the traction wheel side of the machine.

When the shoe 10 engages the ground while the tractor is under forward motion, there will be a very considerable rearward strain on the same, produced by the frictional contact of the shoe with the ground, and to take this strain and to cause the shoe to slip on the ground, the front end thereof is connected to the rear end of a cable, preferably in the form of a chain, 13, the front end of which is attached to the right hand front portion of the truck frame 1.

In practice, it has been found that it is impossible to accidentally tip this tractor over by running the same on a hillside, or by running the tractor wheel into a depression. On the other hand, I have found that under the same conditions, the tractor will be frequently tipped over without the anti-tipping device applied thereto. The said anti-tipping device adds very little to the cost of the tractor, and when not called into service, occupies a normal position ready for action and entirely out of the way, so that it will not interfere with any of the operations of the tractor.

What I claim is:

1. The combination with a tractor, of an anti-tipping device in the form of a leg pivotally connected to one side thereof at its upper end, with its free lower end arranged to swing outward and into contact with the ground, to prevent the tractor from being tipped over by a tilting movement in that direction, and a tension member connected to the lower portion of said leg and to the front portion of said tractor.

2. The combination with a tractor having a relatively large traction wheel, an offset rear wheel and a steering wheel located in front of said traction wheel, of an anti-tipping device comprising a leg pivotally hung at its upper end in the vicinity of the upper outer portion of said traction wheel with its free lower end arranged to swing outward into contact with the ground to prevent the tractor from being tipped over by a tilting movement toward the same, the said leg at its lower end having a shoe arranged to slide on the ground in the anti-tipping action.

3. The combination with a tractor having a relatively large traction wheel, an offset rear wheel and a steering wheel located in front of said traction wheel, of an anti-tipping device comprising a leg pivotally hung at its upper end in the vicinity of the upper outer portion of said traction wheel with its free lower end arranged to swing outward into contact with the ground to prevent the tractor from being tipped over by a tilting movement toward the same, and a cable attached to the lower portion of said leg and to the front portion of the tractor.

4. The combination with a tractor having a relatively large rear traction wheel, an offset rear wheel and a steering wheel located in front of said traction wheel, of an anti-tipping device comprising an upright channel bar rigidly secured to the tractor framework just outward of said traction wheel, a leg having its upper end pivotally connected to the upper end of said channel bar and normally resting therein, a ground engaging shoe applied to the lower free end of said leg, and a cable connecting the lower portion of said leg to the front portion of said tractor.

In testimony whereof I affix my signature in presence of two witnesses.

D. MAURICE HARTSOUGH.

Witnesses:
HARRY D. KILGORE,
F. D. MERCHANT.